United States Patent [19]

Steigelmann et al.

[11] 4,047,908

[45] Sept. 13, 1977

[54] GAS SEPARATION MEMBRANE

[75] Inventors: Edward F. Steigelmann; Robert D. Hughes, both of Park Forest, Ill.

[73] Assignee: Standard Oil Company, Chicago, Ill.

[21] Appl. No.: 497,481

[22] Filed: Aug. 14, 1974

Related U.S. Application Data

[60] Division of Ser. No. 365,203, May 30, 1973, Pat. No. 3,865,890, which is a continuation-in-part of Ser. No. 335,012, Feb. 23, 1973, abandoned.

[51] Int. Cl.$^2$ .............................................. B01D 53/22
[52] U.S. Cl. .................................. 55/158; 210/500 M
[58] Field of Search .................................. 55/16, 158; 117/138.8 N; 210/22, 23, 500

[56] References Cited

U.S. PATENT DOCUMENTS

| 3,088,791 | 5/1963 | Cline et al. ............... 117/138.8 N X |
| 3,276,996 | 10/1966 | Lazare ...................................... 210/22 |
| 3,327,859 | 6/1967 | Pall ....................................... 210/266 |
| 3,524,546 | 8/1970 | Huehn et al. ............... 210/500 M X |
| 3,770,842 | 11/1973 | Steigelmann et al. ............... 55/16 X |
| 3,812,651 | 5/1974 | Steigelmann ............................ 55/16 |
| 3,844,735 | 10/1974 | Steigelmann et al. ................... 55/16 |

*Primary Examiner*—Frank A. Spear, Jr.
*Attorney, Agent, or Firm*—Bernard & Brown

[57] ABSTRACT

Novel gas separation film membranes are made by grafting alpha-olefinic, polymerizable monomers having hydrophilic functional groups and having, e.g., about from 2 to about 12 carbon atoms, to nylon, and forming a film from the resulting copolymers. A complex-forming metal component which is active in the presence of water is provided in the film. The invention also includes the process of separating components from gaseous mixtures using the membranes. Of particular interest is the separation of aliphatically-unsaturated hydrocarbons from mixtures, for example, the separation of ethylene from one or more of ethane, methane and hydrogen.

10 Claims, No Drawings

GAS SEPARATION MEMBRANE

This application is a division of our copending application Ser. No. 365,203, filed May 30, 1973, now U.S. Pat. No. 3,865,890, which in turn is a continuation-in-part of our copending application Ser. No. 335,012, filed Feb. 23, 1973, now abandoned.

This invention relates to hydrophilic, semi-permeable polymer membranes containing complex-forming metals, comprising copolymers produced by grafting monomers to nylon polymers. The grafting serves to increase the hydrophilic properties of the nylon polymers. The invention is also directed to the preparation of such membranes and to their use in processes for separating one or more components from gaseous mixtures.

There is considerable commercial interest in separating components, e.g., aliphatically-unsaturated hydrocarbons, from gas mixtures containing such materials. The aliphatically-unsaturated hydrocarbons are reactive materials that serve in various roles, generally as intermediates in chemical syntheses. A number of the unsaturated hydrocarbons are employed as monomers in the formation of polymers and, in this regard, olefins such as ethylene, propylene, butadiene and isoprene are well known. These olefins, as well as other unsaturated materials, for instance, acetylene, are also used to form relatively low molecular weight products.

The aliphatically-unsaturated hydrocarbons are most often made available on a commercial basis in admixture with other chemical compounds, frequently other hydrocarbons. These unsaturated hydrocarbon-containing streams are usually by-products of chemical syntheses or separation processes. When the hydrocarbon streams are liquid under normal conditions or can readily be made so, ordinary distillation techniques can be used to separate the hydrocarbon components providing they have sufficiently different boiling points for the process to be economically feasible. Especially when the hydrocarbon mixtures contain materials having close boiling points, which is frequently the case with hydrocarbons of the same number of carbon atoms or having a difference of only one carbon atom, distillation may not be an attractive separation procedure. In such cases, more expensive processes are often used and involve operations such as solvent extraction or extractive distillation which entail considerable expense, if indeed they are technically feasible in a given situation.

When the mixture containing the aliphatically-unsaturated hydrocarbon is essentially in a gaseous state at normal or ambient conditions of temperature and pressure, separation of the desired component from the mixture may be even more troublesome. In these situations, cryogenic processes may be used, but they are expensive. The components of these normally gaseous mixtures may not even have particularly close boiling points, but, nevertheless, the mixture must be cooled in order to separate one or more of its components. In spite of the considerable cost of cryogenic operations, the procedure has been employed commercially for the separation of ethylene from other gaseous materials such as ethane and methane.

Our copending application cited above describes methods for separating materials, e.g. aliphatically-unsaturated hydrocarbons, from mixtures containing them, and these procedures involve the combined use of liquid barrier permeation and metal complexing techniques which can exhibit high selectivity factors. In the processes, the liquid barrier is an aqueous solution containing metal ions which will complex with the material to be separated, and the liquid barrier is employed in conjunction with a semi-permeable membrane which is essentially impermeable to the passage of liquid. In preferred systems of this type the liquid barrier containing the complex-forming metal ions is at least partially within a hydrophilic, semi-permeable film membrane. When operating in this manner, there is no need to maintain contact of the film with a separate or contiguous aqueous liquid phase during the process, thereby facilitating the use of a greater variety of semi-permeable members as far as physical configuration is concerned. Thus, the membranes can be designed without the hindrance of having to provide a separate liquid phase adjacent the film, and this may enable the use of film configurations having a greater surface or contact area.

In systems for conducting separations in which the aqueous liquid is disposed as a distinct liquid phase on the feed side of the semi-permeable membrane, there is the disadvantage of having to introduce the hydrocarbon mixture into the liquid phase, thereby reducing the effective rate or selectivity of the separation. Alternatively, the aqueous liquid phase has been held in contact with a semi-permeable membrane by absorbing the liquid in a porous solid such as filter paper, and holding the wet paper next to the semi-permeable membrane in, for instance, a sandwich-type cell construction. The physical limitations of this system make it unattractive, especially since the sandwich construction cannot easily be made in shapes which afford a sufficiently high surface area of film to provide good separation rates. Thus, the flow or separation capacity of these systems may make them economically less advantageous than other types of operations. The use of semi-permeable membranes having the liquid barrier within the film overcomes these disadvantages to a considerable extent, and offers high separation rates for a given investment in equipment. Moreover, the latter procedure avoids the necessity for maintaining a separate liquid aqueous phase in the system, and contact of the aqueous phase and the feed mixture containing the aliphatically-unsaturated hydrocarbon to be separated can thereby be facilitated. The film membranes can thus be essentially homogeneous materials which are suitable for forming into various shapes, and the membranes may be formed by, for instance extrusion and can be made into hollow fiber membranes. These fibers are preferred membrane configurations because they have the advantages of high surface area per unit volume, thin walls for high transport rates, and high strength to withstand substantial pressure differentials across the membrane or fiber walls. Sandwich membranes cannot readily be fabricated into the hollow fiber form.

In one manner of making the semi-permeable film membranes a film-forming material, such as a nylon polymer, is physically mixed with a hydrophilic polymer, such as polyvinyl alcohol, and the mixture is formed into the desired membrane. Problems arise when using this manner of forming the films. Since the physically mixed polymer solution cannot be kept homogeneous while making the films, islands form in the mixture. These islands are simply aggregates of a single polymer which tend to impart homopolymer properties, as opposed to mixed polymer properties, to certain regions in the membranes. Also, due to the diffusing penetrant gases contacting the film during prolonged use, some leaching of the hydrophilic polymer may occur, thereby decreasing the effectiveness of the membrane. These problems have been overcome in the present invention by chemically, rather than physically, binding the polymers by grafting techniques. It has been discovered that monomers containing a hydrophilic functional group can be grafted to the film-forming polyamides, to yield membranes which have increased uniformity in polymer distribution and exhibit superior efficiency for longer periods of time, without adversely affecting the hydrophilic property of the film membrane. The more uniform distribution of the grafted hydrophilic monomer permits a more uniform and more efficient addition of the complex-forming metal components to the membrane. The avoidance or reduction of leaching results from the increased hydrophilic nature of the membrane which maintains the ionization of the complexing metals.

The membrane films of this invention are preferably produced by forming a mixture of nylon, the monomer to be grafted and the grafting catalyst and proceeding with the grafting reaction. The solid product can be separated by filtration, washed and dried. The film can be made from a solution of the grafted copolymer. The film can be subsequently provided with the complex-forming metal component. Variations to this procedure may be used, for example in the grafting step, as more fully outlined below. Another method comprises first forming a film with the nylon and then contacting the film with the monomer and catalyst in solution to form the graft copolymer. These methods simplify the process of making the membranes commercially by, for example, permitting hot melt extrusion of the copolymer. Since it is difficult to melt two polymers together, prior methods included mixing in solvent solutions. The use of hot melt extrusion casting avoids the use of toxic solvents in the mixing and casting operations.

The monomers which can be grafted to the nylon are alpha-olefinic, usually contain from 2 to about 12 carbon atoms, and have one or more hydrophilic functional groups, e.g., active polymerizable vinyl monomers. The monomers may contain more than 12 atoms, especially where the monomer contains an abundance of hydrophilic functional groups. The monomers often consist essentially of carbon, hydrogen, and oxygen, with or without nitrogen and are often, but not necessarily, water-soluble. The addition-polymerizable monomers which may be used include the alcohols, esters, sulfamates, phosphonates, carboxylates and the like, and especially the vinyl alcohols, vinyl esters such as the lower alkyl esters of acrylic and methacrylic acids, vinyl ethers, acrylamides, and the like. The hydrophilic monomer is employed in an amount sufficient to enhance the hydrophilic property of the polyamide, and may, for instance, be up to about 90 weight percent or somewhat more of the composition, based on the total polyamide and monomer. The combined or grafted monomer component is often at least about 30 weight percent on this basis, to impart more significant properties to the resulting film. Preferably, the grafted monomer is about 40 to about 75 weight percent of their total weight. The chain length of the polymer grafts to the nylon may be up to about 10 or 20 or more monomer lengths, and the grafts may be formed with, for instance, up to about 15 percent of the total nitrogen atoms of the polyamide, often with at least about 1 up to about 5 or 10 percent of the total polyamide nitrogen atoms.

The film-forming materials which are employed to provide one component of the semi-permeable film membranes used in the present invention are those having a polyamide as an essential constituent. The polyamide film-forming materials are generally known and have also been designated as nylons. These polymers are characterized by having amide groups serving as recurring linkages between carbon chains in the product structure, and the polymers may be made by several procedures. Commonly, the polyamides are formed by reacting a polyamine and a dicarboxylic acid or its derivative such as an ester, especially a lower alkyl ester having, for instance, about 1 to 4 carbon atoms in each ester group. Other reactions which may be employed to form the polyamides include the self-condensation of monoamino, monocarboxylic acids and the reactions of cyclic lactams. In any event, the polyamide products contain recurring amide groups as an integral part of the principle polymer chain. The polyamides are described, for instance, in the Kirk-Othmer, *Encyclopedia of Chemical Technology,* Second Edition, Volume 16, beginning at page 1, Interscience Publishers, New York, 1968. Among the typical structural formulas of the linear polyamides are $H_2NRNH(COR'CONHRNH)_nCOR'$ $COOH$ and $H_2NRCO(NHRCO)_n NHRCOOH$, where R and R' represent primarily carbon-to-carbon chains between functional groups in the reactants, and n represents the degree of polymerization or the number of recurring groups in the polymer chain. The polyamides which can be used in this invention are generally solid at room temperature, and have a molecular weight which makes them suitable for forming the desired film membranes. Polyamides of this type are described in, for instance, U.S. Pat. No. 3,355,409.

The carboxylic acids which may be used in forming the polyamides have an acyloxy group (—R—COO—) in their structure and the R member of this group is composed essentially of carbon and hydrogen and often contains about 6 to 12 carbon atoms. Such groups may be aliphatic, including cycloaliphatic, aromatic, or a mixed structure of such types, but the groups are preferably aliphatic and saturated with respect to carbon-to-carbon linkages. These R groups may preferably have straight chain carbon-to-carbon or normal structures. Among the useful dicarboxylic acid reactants are adipic acid, sebacic acid, azelaic acid, isophthalic acid, terephthalic acid, and the methyl esters of these acids.

The polyamines employed in making the polyamide film-forming membranes generally have at least two non-tertiary, amino nitrogen atoms. These nitrogen atoms may be primary or secondary in configuration, although amines having at least two primary nitrogen atoms are preferred. The polyamines may also have both primary and secondary nitrogen atoms and the polyamines may contain tertiary nitrogen atoms. The preferred polyamine reactants have aliphatic, including cycloaliphatic, structures, and often have from 2 to about 12 carbon atoms. Also, the preferred polyamines are saturated and have straight-chain structures, although branched-chain polyamines can be used. Among the useful polyamines are ethylene diamine, pentamethylene diamine, hexamethylene diamine, diethylene triamine, decamethylene diamine and their N-alkyl substituted derivatives, for instance, the lower alkyl derivatives which may have, for instance, 1 to 4 carbon atoms in each alkyl substituent.

Preferred grafting techniques involve the use of a catalyst to initiate grafting. A large variety of grafting catalysts and particularly free radical graft polymerization catalysts may be used. Ammonium persulfate is of particular interest, as well as organic peroxide catalysts such as benzoyl peroxide, lauryl peroxide, tertiarybutylhydroperoxide, and cumene peroxide. Other water soluble, free radical-forming catalysts include potassium sulfate, sodium sulfate or ammonium sulfate together with sulfur dioxide, alkali metal hydrosulfites, alkali metal pyrosulfites or alkali metal thiosulfates. When using these free radical-forming catalysts, quantities of, for instance, about 0.1 to 10, preferably 0.5 to 5% by weight based on the total weight of the monomer may be used. The temperature range for effecting grafting by using these catalysts may be about 20° to 90° C., preferably about 40° to 65° C.

Preferred catalysts for grafting are the ceric salts. The useful ceric salts may include ceric nitrate, ceric sulfate, ceric ammonium nitrate, ceric ammonium sulfate, ceric iodate, and the like. Additionally, one may make use of ceric dihexyl sulfosuccinate ceric dioctyl sulfosuccinate. These ceric salts are preferably dissolved or dispersed in an acidic material, preferably an inorganic acidic material, prior to use. The pH of the ceric salt acid medium should be 3.5 or below. The acidic material may be, for instance, sulfuric acid, perchloric acid, nitric acid and the like. These catalyst grafting techniques are more fully described with examples in U.S. Pat. Nos. 3,046,078 and 3,557,247, incorporated herein by reference.

The film membranes of this invention may have a thickness of up to about 30 mils. or more. Preferably the thickness is up to about 10 mils. The films are sufficiently thick to avoid rupture during use and generally have a thickness of at least about 0.001 mil. The film is sufficiently hydrophilic to hold the liquid barrier solution at least partly within the membrane. This hydrophilic property is present in the film membrane due to the character of both the nylon polymer and the grafted hydrophilic monomer. The hydrophilicity may also be further increased by the addition of other hygroscopic agents. These optional hydrophilic agents used in addition to and not in place of the grafted monomers include, for instance, ethylene glycol, glycerol and propylene glycol. The film membrane may be considered sufficiently hydrophilic to be useful if it absorbs at least about 5 weight percent of water when immersed in distilled water for one day at room temperature and pressure.

In the present invention, the metals which serve in the form of metal-containing cations to separate a component from a mixture through the formation of metal complexes of desired properties, include, for instance, the transition metals of the Periodic Chart of Elements having atomic numbers above 20. Included in these metals are those of the first transition series having atomic numbers from 21 to 29, such as chromium, copper, especially the cuprous ion, manganese and the iron group metals, e.g., nickel and iron. Others of the useful complex-forming metals are in the second and third transition series, i.e., having atomic numbers from 39 to 47 or 57 to 79, as well as mercury, particularly as the mercurous ion. Thus, we may employ noble metals such as silver, gold and the platinum group, among which are platinum, palladium, rhodium, ruthenium and osmium. The useful base metals of the second and third transition series include, for example, molybdenum, tungsten, rhenium and the like. Various combinations of these complex-forming metals may also be employed in this invention, either in the presence or absence of other non-metal or non-complexing metal components.

The metal is provided in the film or in aqueous liquid barrier of the separation system in a form which is soluble in this liquid. Thus, the various water-soluble salts of these metals can be used such as the nitrates and halides, for instance, the bromides and chlorides, fluoborates, fluosilicates, acetates, carbonyl halides or other salts of these metals which can serve to form the desired water-soluble complexes when the film is in contact with water. The metal salts should not react with any components of the chemical feedstock used in the separation procedure to form an insoluble material which could block the film membrane or otherwise prevent the separation of a component from the feedstock. Also, in a given system, the metal is selected so that the complex will readily form, and yet be sufficiently unstable, so that the complex will decompose and the disassociated material leave the liquid barrier, thereby providing a greater concentration of the material to be separated from the exit side of the membrane than is in the feed. The concentration of the metal ions in the film or liquid barrier may be rather low and still be sufficient to provide an adequate complexing rate so that excessive amounts of the semi-permeable membrane surface will not be needed to perform the desired separation. Conveniently, the concentration of the complex-forming metal ions in the aqueous solution forming the liquid barrier is at least about 0.1 molar and is preferably about 0.5 to 12 molar. Advantageously, the solution is less than saturated with respect to the complex-forming metal ions to insure that essentially all of the metal stays in solution, thereby avoiding any tendency to plug the film membrane and destroy its permeability characteristics.

When the complexing ions in the liquid barrier employed in this invention include cuprous ions, ammonium ions can be used to provide copper ammonium complex ions which are active to form a complex with the material to be separated by the use of the film. We preferably supply about equimolar amounts of cuprous and ammonium ions, although either type of ions may be in excess. The ammonium ions can be provided in various convenient ways, preferably as an acid salt such as ammonium chloride or as ammonium hydroxide or ammonium carbonate. In order to enhance the selectivity of the copper ammonium ion complex in the separation of this invention, we may also make the film and thus the liquid barrier solution more acidic, by, for instance, providing a water-soluble acid such as a mineral acid, especially hydrochloric acid in the film or liquid barrier solution. Preferably, the pH of the liquid barrier in this form of the invention is below about 5 with the acid in the solution. Since silver may form undesirable acetylides with acetylenes, the copper ammonium complex may be a more attractive complexing agent when it is desired to use the film to separate acetylenes from various mixtures.

Instead of supplying only a noble metal for complexing the material to be separated in the process of this invention, we may also employ mixtures of noble metal and other cation-providing materials. A portion of the noble metal may be replaced by non-noble metal or ammonium components. Accordingly, the total of such ion-forming materials in the film or in the liquid barrier may be composed of a minor or major amount of either the noble metal or the non-noble metal, ammonium or other components. Solutions having a major amount of the non-noble metal, ammonium or other cation-providing materials not containing a noble metal will generally be less expensive, and, accordingly, the noble metal may be as little as about 10 molar percent or less of the total cation-providing material in the solution. To reduce expenses at least about 10 molar percent, preferably at least about 50 molar percent, on a cation basis of the total, a cation-providing material may be other than noble metal. The non-noble or base metals are preferably of Groups II to VIII of the Periodic Chart of Elements, and especially those in the fourth and fifth periods, aluminum and magnesium. Zinc and cuprous ions are preferred ones among these non-noble or base metal components. The various metals may be provided in the liquid barrier in the form of any suitable compound, such as the acid salt forms mentioned above with respect to the noble metals.

The amount of water in the liquid barrier employed in this invention may be a minor portion of the liquid phase, but preferably is a major portion or even essentially all of the liquid, on a metal salt-free basis. Thus, small or minor amounts of water, say as little as about 5 weight percent, on a salt-free basis in the liquid phase may serve to provide significant transport for the material to be separated across the liquid barrier. Any other liquid present in the barrier is preferably water-miscible and should be chosen as not to have a substantial deleterious effect on the separation to be accomplished. The liquid barrier may also contain a hygroscopic agent, e.g., in a minor amount, to improve the wetting or hydrophilic properties of the liquid and provide better contact with the feed gas.

In the system of the present invention, the amount of complex-forming metal in the semi-permeable membrane may vary considerably, but is sufficient to accomplish the desired separation. Often, this is a minor amount, say, about 1 to 50 weight percent, of the weight of the membrane on a non-aqueous basis, preferably about 5 to 25 weight percent. A suitable procedure for placing the solution of complex-forming metal in the semi-permeable film is by contacting the film with the solution and exerting a differential pressure across the solution and film. Thus, the pressure behind the solution is greater than that on the opposite side of the film, and as a result, the solution is forced into the film under pressure. Conveniently, the pressure on the solution is above atmospheric, and the opposite side of the film is essentially at atmospheric pressure. The pressure differential need not be large, for instance, it may only be at least about 5 or 10 psi, and it should not be so great that the film is ruptured. This procedure could also be used to reactivate films which have been used for very long periods of time to the point where they have lost selectivity.

The membrane containing the complex-forming metal may be handled and transported in an essentially non-aqueous form or with some water therein, for instance, an insufficient amount of water to be effective in the separation. In such case, water would be added to the membrane to give a film bearing sufficient water to be useful in performing the separation process of the invention. During use of the membrane, the amount of water present is preferably less than that which gives a substantial distinct or separate aqueous phase on the feed inlet side of the membrane. The film membrane can be wetted initially, and if it has a tendency to dry during use, additional water can be placed in the film while it is used on-stream in the separation, for instance, by inclusion of moisture in the gaseous feed charged to the system. Alternatively, but less advantageously, the operation can be stopped for addition of water to the film. The water could be added at intervals by stopping the feeding of the gaseous mixture to the system, and charging water to the membrane at such times. In any event, care should be taken to insure that the film membrane during use is not so dry that it will exhibit non-selective permeability to the material to be separated from the feed, and will thereby not serve to separate a product having an increased concentration of the desired ingredient.

The film membranes employed in the process of this invention are of the essentially water-insoluble, hydrophilic, semi-permeable type. In the absence in the film of the liquid containing the complex-forming ions, the film is generally not adequately selective with respect to the passage of or permeation by the material to be separated to perform the desired separation at the desired rate. Often, the film is permeable to essentially all of the components in the gaseous feedstock used in this invention. However, by having the film contain sufficient aqueous liquid to form a barrier, the simple diffusion of gas through the film is reduced or prevented, and the components of the feed stream must, therefore, traverse the film primarily by becoming part of, and then being separated from, the aqueous liquid phase contained in the film. Thus, in the absence of the complexing metal ion in the aqueous medium, there could be a slight separation effected by the use of water as the liquid medium since the individual components in the gas may exhibit differing solubilities in water. In the method of the present invention, however, the selectivity of the separation is greatly increased due to the presence of the complex-forming metal ions in the aqueous barrier medium. Also, during use in the process of this invention, the film has a sufficient amount of the aqueous medium so that adequate metal ions are in solution, or at least react as if they are, to perform the desired separation.

The film membranes which can be employed in this invention are preferably self-supporting and have sufficient strength not to require any additional supporting material on either of its sides during use. With some films, however, it may be necessary, advantageous or convenient to provide adequate support such as additional film or sheet-like materials on one or both sides of the film membrane. These supporting structures are frequently very thin materials and may be permeable to both liquids and gases and not serve a separating function with respect to any component of the feed stream. Alternatively, the supporting film may be permeable to gases, but not to liquids.

The metal-containing, semi-permeable films made by the procedure of the present invention may be employed, for instance, to separate one or more unsaturated hydrocarbons by the liquid barrier-complex-forming technique having the barrier in the film. Although the aliphatically-unsaturated hydrocarbon products thus provided may be quite pure materials, for instance, of greater than 99% purity, the separation procedure may be used merely to provide a significant increase in the concentration of a given aliphatically-unsaturated hydrocarbon in a mixture with other components of the feedstock.

The process can be employed to separate various aliphatically-unsaturated hydrocarbons from other ingredients of the feed mixture providing at least one of the aliphatically-unsaturated hydrocarbons exhibits a complexing rate or transfer rate across the liquid barrier in the film that is greater than at least one other dissimilar or different component of the feedstock. Quite advantageously, the system can be used to separate aliphatically-unsaturated hydrocarbons from other hydrocarbons which may be aliphatically saturated or aliphatically-unsaturated, or from non-hydrocarbon materials, including fixed gases such as hydrogen. The feed mixture may thus contain one or more paraffins, including cycloparaffins, mono- or polyolefins, which may be cyclic or acyclic, and acetylenes or alkylenes, and the mixture may include aromatics having such aliphatic configurations in a portion of their structure. Often, the feed mixture contains one or more other hydrocarbons having the same number of carbon atoms as the unsaturated hydrocarbon to be separated or only a one carbon atom difference. Among the materials which may be separated according to this invention are ethylene, propylene, butenes, butadiene, isoprene, acetylene and the like.

In the method, the mixture containing the aliphatically-unsaturated hydrocarbon to be separated may be essentially in the gaseous or vapor phase when in contact with the liquid barrier having dissolved therein one or more metal ions which form a complex with the unsaturated hydrocarbon. The liquid barrier can be within and thus in contact with the semi-permeable membrane which may be permeable to the aliphatically-unsaturated hydrocarbon-containing mixture in the absence of the liquid barrier. The membrane can be said to immobilize the liquid barrier within the membrane. The liquid barrier may in essence be completely within the semi-permeable structure, and the liquid does not pass from the membrane to an excessive extent under the conditions of operation. The membrane is, however, selectively permeable in the presence of the liquid barrier to the component of the feedstock to be separated. Since there is little, if any, passage for the feedstock across the separation zone except by becoming part of or reacting with the liquid barrier, this liquid barrier controls the selectivity of the liquid barrier-semi-permeable membrane combination.

The liquid barrier contains sufficient water and soluble metal ions to form a suitable complex with at least one aliphatically-unsaturated hydrocarbon component of the feed subjected to the separation procedure. The metal ions readily form the complex upon contact with the feed, and, in addition, the complex dissociates back to the metal ion and an aliphatically-unsaturated hydrocarbon component of the complex, under the conditions which exist on the discharge side of the liquid barrier and semi-permeable membrane as employed in the process. The released aliphatically-unsaturated hydrocarbons exit the discharge side of the membrane and can be removed from the vicinity of the barrier and its supporting structure as by a sweep gas or through the effect of vacuum on this side of the barrier. Thus, the unsaturated hydrocarbon-metal complex forms and is decomposed in the complex metal ion-containing liquid barrier, and, as a result, the material passing through the barrier is more concentrated with respect to at least one aliphatically-unsaturated hydrocarbon component present in the feed stream.

Often, the reactivity of aliphatically-unsaturated hydrocarbons with the complexing metal ions in their order of decreasing activity goes from acetylenes or dienes to monoolefins, the aliphatically-saturated hydrocarbons and other materials present being essentially non-reactive. Also, different reactivities may be exhibited among the various members of a given type of aliphatically-unsaturated hydrocarbons. The process can thus be used to separate paraffins from monoolefins, diolefins or acetylenes; diolefins from monoolefins; or acetylenes from paraffins, monoolefins or diolefins; as well as to separate a given aliphatically-unsaturated hydrocarbon from another of such materials in its class where the members have differing complexing rates with or transport rates across the liquid barrier. The feed need only contain a small amount of aliphatically-unsaturated hydrocarbon, as long as the amount is sufficient so that the unsaturated material to be separated selectively reacts with the metal complex ions to a significant extent, and thus at least one other component of the feed is less reactive or non-reactive with the complex-forming metal ions.

The aliphatically-unsaturated materials of most interest with regard to separation have 2 to about 8 carbon atoms, preferably 2 to 4 carbon atoms. The separation of aliphatically-unsaturated materials from admixtures containing other gaseous materials, such as the separation of ethylene or propylene from admixtures with other normally gaseous materials, e.g. one or more of ethane, propane, and methane and hydrogen, is of particular importance. Frequently, such feed mixtures for the process contain about 1 to 50 weight percent ethylene, about 0 to 50 weight percent ethane and about 0 to 50 weight percent methane. Another process that may be of special significance is the separation from ethylene or minor amounts of acetylene.

The partial pressure of the aliphatically-unsaturated component of the feed at the input side of the liquid barrier used in the separation is greater than the partial pressure of this unsaturated hydrocarbon on the discharge or exit side of the liquid barrier-semi-permeable membrane composite. This pressure drop of the unsaturated hydrocarbon to be separated may often be at least about 0.5 pound per square inch, and is preferably at least about 20 psi, although the pressure drop should not be so great that the liquid barrier is ruptured or otherwise deleteriously affected to a significant extent. Conveniently, the total pressure of the feed is up to about 1000 pounds per square inch. The discharge partial pressure of the unsaturated hydrocarbon can preferably be controlled by subjecting the exit side of the liquid barrier to the action of a sweep gas that may be essentially inert to forming a complex with the metal ions in solution in the liquid barrier. The sweep gas picks up the discharged aliphatically-unsaturated components, and the sweep gas may be selected so that it can be readily separated from the aliphatically-unsaturated hydrocarbon material if that be necessary for the subsequent use of the unsaturated hydrocarbon. Unless a reaction with the separated hydrocarbon is desired, the sweep gas should be relatively inert therewith and may be, for instance, butane, carbon dioxide or the like.

The temperature across the liquid barrier-semipermeable film composite employed in the separation procedure can be essentially constant or it may vary, and decomposition of the metal-unsaturated hydrocarbon complex can be affected primarily by the drop in partial pressure of the aliphatically-unsaturated hydrocarbon on the exit side of the liquid barrier compared with the partial pressure on the feed side. Conveniently, the temperature of the liquid barrier may be essentially ambient, especially in the case of feedstocks that are gaseous at this temperature and the pressure employed on the feed side of the liquid barrier. The temperature of the liquid barrier may, however, be reduced or elevated from ambient temperature. Often, the temperature may be up to about 100° C., and elevated temperatures may even be desired to put the feedstock in the gaseous or vapor phase. Neither the temperature nor the pressure used should, however, be such as to destroy the difference in transport rate across the liquid barrier, semi-permeable film composite of the aliphatically-unsaturated hydrocarbons whose separation is sought, compared with that of the other components of the feed. The conditions should also not be such that physical disruption of the liquid barrier or any other significant malfunction results.

The methods and products of this invention and their value are shown further by the following examples. Unless otherwise indicated, the percentages given are on a weight basis.

3.0 grams of a polyamide (Elvamide 8061 (DuPont) nylon) resin, 150 ml. of 0.01M $Ce(NH_4)_2(SO_4)_3$ in 0.2N $H_2SO_4$, and 15 ml. of freshly distilled vinyl acetate are added to a flask being purged with argon. The mixture is stirred at room temperature for 15 minutes while the argon purge continues. During this time the grafting reaction occurs. The mixture is filtered and the solids are washed with 2N $H_2SO_4$ and then with water. After drying, the solid is weighed and the grafting efficiency determined to be 46% by weight of the uptake.

The nylon-polyvinyl acetate grafted copolymer can be cast into a film and saponified as follows:

A 10% by weight solution of the grafted copolymer in methanol is prepared. A film is cast from the solution with a 6 mil doctor knife onto a clean 4 inches × 8 inches glass plate and allowed to dry. This film is heated to 40° to 70° C. for four hours in a 10% sodium hydroxide solution, during which time saponification occurs to form the corresponding nylon-polyvinyl alcohol copolymer. The film is then washed and dried, and subsequently impregnated with a gas separation promoting compound, for example essentially saturated with a 4M $AgNO_3$ solution, for use as a gas separation membrane.

To test the effectiveness of the films of the present invention, membranes made as described above, without saponification and without silver nitrate impregnation, with saponification but without impregnation, and with both saponification and impregnation are tested.

For testing, a closed glass cell is used in which the membrane is placed so as to divide the cell into an inlet and an outlet side. A gas inlet tube passes through the cap of the cell and extends into the cell ending near the membrane. A tube of larger diameter surrounds the inlet or feed tube forming an annular passage which permits exhaust of those gases which do not permeate the membrane. On the outlet side of the cell and membrane another annular arrangement is used whereby a purging gas, helium, passes into the outlet side of the cell and sweeps away gases which have permeated the membrane. The helium passes in through the smaller tube and carries away the permeated or separated gases through the surrounding annular passage. The test cell is divided into upper and lower compartments by locating the membrane horizontally across the cell. The cell internal cross-sectional area is 3.8 cm.$^2$ and the cross-section is fully covered by the film membrane in a manner to provide an effective membrane area of 2.2 cm.$^2$ The main body of the cell has a height of 41 mm. and a gas outlet at each end. The feed inlet tube enters the upper end of the cell and opens about 5 mm. above the film, and the sweep gas inlet tube enters the lower end of the cell and opens about 1 mm. below the film.

A mixed gas of methane, ethane, and ethylene is humidified at 125° F. and is supplied to the cell at 10 ml/min. under a pressure of 30 psig. The permeate through the membrane is purged from the cell with a 10 ml/min. stream of helium. The permeate composition and permeation rate are determined for each film tested. These results are summarized in Table I below.

Table I

| Film Used | Permeate Composition (Wt. %) | | | Perm. Rate | |
|---|---|---|---|---|---|
| | Methane | Ethylene | Ethane | ml/cm$^2$-min | S |
| Feed Composition | 18.9 | 49.7 | 31.4 | — | — |
| Nylon-Polyvinyl Acetate Graft Copolymer | 40.8 | 46.2 | 13.0 | 0.000056 | 1.0 |
| Nylon-Polyvinyl Alcohol Graft Copolymer | 19.1 | 50.2 | 30.7 | 0.0115 | 1.1 |
| Nylon-Polyvinyl Alcohol Graft Copolymer + Ag$^+$ | 0.45 | 98.4 | 1.15 | 0.0056 | 65.2 |

$$S = \frac{[Ethylene]_{Permeate}}{[Methane + Ethane]_{Permeate}} \times \frac{[Methane + Ethane]_{Feed}}{[Ethylene]_{Feed}}$$

As the table shows, the nylon-polyvinyl acetate graft copolymer and the nylon-polyvinyl alcohol graft copolymer produce about a 50% ethylene permeate where the feed has approximately this portion of this component. The nylon-polyvinyl alcohol graft copolymer impregnated with the silver salt solution produces, however, a greater than 98 % ethylene permeate from the same feed. This difference is vividly exhibited by a comparison of the selectivity, S, which is essentially unity for the film having no silver salt, but 65.2 for the film of the present invention.

It is claimed:

1. A hydrophilic, semi-permeable, water-insoluble, film membrane comprising a grafted copolymer consisting essentially of nylon having polyvinyl alcohol grafted thereto, said membrane having therein a metal component which in the presence of water will provide cations that are capable of forming a complex with aliphatically-unsaturated hydrocarbons.

2. The membrane of claim 1 wherein the polyvinyl alcohol comprises about 40 to 75% by weight of said copolymer.

3. The membrane of claim 2 wherein said metal component is noble metal.

4. The membrane of claim 3 wherein said noble metal is silver.

5. The membrane of claim 4 wherein said noble metal is silver.

6. The membrane of claim 1 wherein said metal component is noble metal.

7. The membrane of claim 1 wherein said metal component is provided in the membrane as a water-soluble salt.

8. The membrane of claim 1 wherein said metal component is present as ions by contact of said membrane with water to form a liquid barrier, said metal component being present in an amount sufficient to provide a molar concentration of about 0.5 to 12 in said liquid barrier.

9. The membrane of claim 8 wherein said metal component is noble metal.

10. The membrane of claim 9 wherein said noble metal is silver.

* * * * *